US009378613B2

(12) United States Patent
Allen et al.

(10) Patent No.: US 9,378,613 B2
(45) Date of Patent: Jun. 28, 2016

(54) SYSTEMWIDE GAME MODIFIERS FOR GAMING SYSTEMS

(75) Inventors: Jeffrey L. Allen, Naperville, IL (US); Sudhir Bejawada, Glendale Heights, IL (US); Thor E. Perplies, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 482 days.

(21) Appl. No.: 13/702,454

(22) PCT Filed: Jun. 7, 2011

(86) PCT No.: PCT/US2011/039437

§ 371 (c)(1),
(2), (4) Date: Dec. 6, 2012

(87) PCT Pub. No.: WO2011/156367

PCT Pub. Date: Dec. 15, 2011

(65) Prior Publication Data

US 2013/0095914 A1 Apr. 18, 2013

Related U.S. Application Data

(60) Provisional application No. 61/352,037, filed on Jun. 7, 2010.

(51) Int. Cl.
*G06F 17/00* (2006.01)
*G07F 17/32* (2006.01)

(52) U.S. Cl.
CPC .................................. *G07F 17/3225* (2013.01)

(58) Field of Classification Search
None
See application file for complete search history.

(56) References Cited

U.S. PATENT DOCUMENTS

| | | | | |
|---|---|---|---|---|
| 6,050,895 | A * | 4/2000 | Luciano et al. | 463/7 |
| 7,607,977 | B2 | 10/2009 | Baerlocher et al. | |
| 8,480,482 | B2 * | 7/2013 | Walker et al. | 463/25 |
| 2007/0281790 | A1 * | 12/2007 | Franklin et al. | 463/42 |
| 2009/0093300 | A1 * | 4/2009 | Lutnick et al. | 463/26 |

(Continued)

FOREIGN PATENT DOCUMENTS

WO WO 2011156367 12/2011

OTHER PUBLICATIONS

"PCT Application No. PCT/US11/39437 International Preliminary Report on Patentability", Aug. 6, 2012 , 4 pages.

(Continued)

*Primary Examiner* — Paul A D'Agostino
(74) *Attorney, Agent, or Firm* — DeLizio Law, PLLC

(57) ABSTRACT

A wagering game system and its operations are described herein. In some embodiments, the operations can include determining that a wagering game system account associated with a player should be awarded a system-wide game modifier based on the players system-wide gaming activity. The operations can also include determining when the player selects each wagering game of a plurality of wagering games selected by the player for play via the wagering game system. The operations can further include, for each wagering game of the plurality of wagering games selected by the player via the wagering game system, determining that the wagering game system account associated with the player has been awarded the system-wide game modifier, and modifying the wagering game based on predefined game modification specifications associated with the wagering game and the system-wide game modifier.

18 Claims, 7 Drawing Sheets

(56) References Cited

U.S. PATENT DOCUMENTS

| | | | | |
|---|---|---|---|---|
| 2009/0124373 | A1 * | 5/2009 | Acres | 463/29 |
| 2009/0318218 | A1 | 12/2009 | Hornik et al. | |
| 2010/0041472 | A1 | 2/2010 | Gagner et al. | |

OTHER PUBLICATIONS

"PCT Application No. PCT/US11/39437 International Search Report", Oct. 26, 2011 , 13 pages.

* cited by examiner

410

| LEVEL | SYSTEMWIDE GAMING ACTIVITY POINT TOTAL | SYSTEMWIDE GAME MODIFIER |
|---|---|---|
| 1 | 5000 | LEVEL 1 SYSTEMWIDE GAME MODIFIER |
| 2 | 15000 | LEVEL 2 SYSTEMWIDE GAME MODIFIER |
| 3 | 30000 | LEVEL 3 SYSTEMWIDE GAME MODIFIER |

FIG. 4A

420

| LEVEL | SYSTEMWIDE GAMING ACTIVITY POINT TOTAL | PREDEFINED COMBINATION OF GAME-SPECIFIC OBJECTIVES | SYSTEMWIDE GAME MODIFIER |
|---|---|---|---|
| 1 | 5000 | GOLD TROPHIES IN EACH OF GAMES A-E | LEVEL 1 SYSTEMWIDE GAME MODIFIER |
| 2 | 15000 | PLATINUM TROPHIES IN EACH OF GAMES A-E | LEVEL 2 SYSTEMWIDE GAME MODIFIER |
| 3 | 30000 | PLATINUM TROPHIES IN EACH OF GAMES A-E + LEVEL 20 IN GAME F + UNLOCK FEATURE X IN GAME G | LEVEL 3 SYSTEMWIDE GAME MODIFIER |

FIG. 4B

430

| LEVEL | SYSTEMWIDE GAMING ACTIVITY POINT TOTAL | PREDEFINED COMBINATION OF GAME-SPECIFIC OBJECTIVES | SYSTEMWIDE GAME MODIFIER |
|---|---|---|---|
| 1A | 5000 | N/A | LEVEL 1A SYSTEMWIDE GAME MODIFIER |
| 1B | 5000 | SILVER TROPHIES IN EACH OF GAMES A-C | LEVEL 1B SYSTEMWIDE GAME MODIFIER |
| 1C | 5000 | GOLD TROPHIES IN EACH OF GAMES A-F | LEVEL 1C SYSTEMWIDE GAME MODIFIER |
| 2A | ⋮ | ⋮ ⋮ ⋮ | ⋮ ⋮ |

FIG. 4C

SYSTEMWIDE GAME MODIFIERS FOR GAMING SYSTEMS

RELATED APPLICATIONS

This application claims the priority benefit of U.S. Provisional Application Ser. No. 61/352,037 filed Jun. 7, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to implementing system-wide game modifiers in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Traditionally, wagering game machines have been confined to physical buildings, like casinos (e.g., major casinos, road-side casinos, etc.). The casinos are located in specific geographic locations that are authorized to present wagering games to casino patrons. However, with the proliferation of interest and use of the Internet, some wagering game manufacturers have recognized that a global public network, such as the Internet, can reach to various locations of the world that have been authorized to present wagering games. Consequently, some wagering game manufacturers have created wagering games that can be processed by personal computing devices and offered via online casino websites ("online casinos").

SUMMARY

In some embodiments, a computer-implemented method comprises determining, at a wagering game server of a wagering game system, that a wagering game system account associated with a player should be awarded a system-wide game modifier based on the player's system-wide gaming activity; determining, at the wagering game server, when the player selects each wagering game of a plurality of wagering games selected by the player for play via the wagering game system; for each wagering game of the plurality of wagering games selected by the player via the wagering game system determining, at the wagering game server, that the wagering game system account associated with the player has been awarded the system-wide game modifier; and modifying the wagering game based on predefined game modification specifications associated with the wagering game and the system-wide game modifier.

In some embodiments, the method further comprises determining, at the wagering game server, when the player selects each non-wagering game of a plurality of non-wagering games selected by the player for play via the wagering game system; for each non-wagering game of the plurality of non-wagering games selected by the player in the wagering game system determining, at the wagering game server, that the wagering game system account associated with the player has been awarded the system-wide game modifier; and modifying the non-wagering game based on predefined game modification specifications associated with the non-wagering game and the system-wide game modifier.

In some embodiments, said determining, at the wagering game server, when the player selects each wagering game or non-wagering game comprises receiving, at the wagering game server, a message from a gaming machine of the wagering game system indicating that the player selected a wagering game or non-wagering game at the gaming machine; and identifying the wagering game or non-wagering game selected by the player at the gaming machine based on identification information included in the message.

In some embodiments, the player's system-wide gaming activity includes the player's gaming activity in one or more physical casinos, in one or more online casinos, and in a virtual gaming community website.

In some embodiments, said modifying the wagering game based on the predefined game modification specifications associated with the wagering game and the system-wide game modifier comprises modifying game content and/or game outcomes of the wagering game based on the predefined game modification specifications associated with the wagering game and the system-wide game modifier.

In some embodiments, said determining, at the wagering game server, that the wagering game system account associated with the player should be awarded a system-wide game modifier based on the player's system-wide gaming activity comprises monitoring, at the wagering game server, the player's system-wide gaming activity; awarding, at the wagering game server, system-wide gaming activity points to the player's wagering game system account based on the player's system-wide gaming activity; determining, at the wagering game server, whether to award a system-wide game modifier to the player based on whether the player's system-wide gaming activity point total exceeds a system-wide gaming activity point threshold; and awarding the player's wagering game system account the system-wide game modifier in response to determining that the player's system-wide gaming activity point total exceeds the system-wide gaming activity point threshold.

In some embodiments, in response to awarding the system-wide game modifier to the player while the player is participating in the wagering game system via a physical casino, revealing to the player how one or more online games will be modified based on the system-wide game modifier if the player participates in the wagering game system via an online casino or a virtual gaming community website, and in response to awarding the system-wide game modifier to the player while the player is participating in the wagering game system via an online casino or a virtual gaming community website, revealing to the player how one or more in-casino games will be modified based on the system-wide game modifier if the player participates in the wagering game system via one or more physical casinos.

In some embodiments, said determining, at the wagering game server, whether to award a system-wide game modifier to the player based on whether the player's system-wide gaming activity point total exceeds a system-wide gaming activity point threshold comprises determining to award the player's system-wide wagering game account a first level system-wide game modifier if the player's system-wide gaming activity point total exceeds a first system-wide gaming activity point threshold; determining to award the player's system-wide wagering game account a second level system-wide game modifier if the player's system-wide gaming activity point total exceeds a second system-wide gaming activity point threshold; and determining to award the player's system-wide wagering game account a third level system-wide game modifier if the player's system-wide gaming activity point total exceeds a third system-wide gaming activity point threshold.

In some embodiments, said modifying the wagering game based on predefined game modification specifications associated with the wagering game and the system-wide game modifier comprises modifying the wagering game based on a first set of predefined game modification specifications if the player's system-wide wagering game account has been awarded the first level system-wide game modifier; modifying the wagering game based on a second set of predefined game modification specifications if the player's system-wide wagering game account has been awarded the second level system-wide game modifier; and modifying the wagering game based on a third set of predefined game modification specifications if the player's system-wide wagering game account has been awarded the third level system-wide game modifier.

In some embodiments, said determining, at the wagering game server, that the player's wagering game system account has been awarded the system-wide game modifier comprises determining that the player's wagering game system account includes an indicator indicating the player has been awarded the system-wide game modifier.

In some embodiments, a wagering game server of a wagering game system, the wagering game server comprising a gaming activity unit configured to monitor in-casino and online gaming activity associated with a player in the wagering game system; determine that a wagering game system account associated with the player should be awarded a system-wide game modifier based on the player's in-casino and online gaming activity in the wagering game system; and a game management unit configured to determine when the player selects each wagering game of a plurality of wagering games selected by the player for play via the wagering game system, wherein, for each wagering game of the plurality of wagering games selected by the player via the wagering game system, the game management unit is configured to determine whether the wagering game system account associated with the player has been awarded the system-wide game modifier; and modify the wagering game based on game modification specifications associated with the wagering game and the system-wide game modifier in response to determining that the wagering game system account associated with the player has been awarded the system-wide game modifier.

In some embodiments, the game management unit is configured to modify game content and/or game outcomes associated with each wagering game selected by the player based on predefined game modification specifications associated with the wagering game and the system-wide game modifier.

In some embodiments, the gaming activity unit configured to determine that the player's wagering game system account should be awarded a system-wide game modifier based on the player's in-casino and online gaming activity comprises the gaming activity unit configured to monitor the player's in-casino and online gaming activity; award system-wide gaming activity points to the player's wagering game system account based on the player's in-casino and online gaming activity; determine whether to award a system-wide game modifier to the player based on whether the player's system-wide gaming activity point total exceeds a system-wide gaming activity point threshold; and award the player's wagering game system account the system-wide game modifier in response to determining that the player's system-wide gaming activity point total exceeds the system-wide gaming activity point threshold.

In some embodiments, a computer-implemented method comprising determining, at a wagering game server of a wagering game system, system-wide gaming activity associated with a player; determining, at the wagering game server, whether to award a system-wide game modifier to the player based on the player's system-wide gaming activity; awarding, at the wagering game server, the system-wide game modifier to a wagering game system account associated with the player in response to determining that the player's system-wide gaming activity qualifies the player for the system-wide game modifier; determining, at the wagering game server, when the player selects a wagering game for play via the wagering game system; determining, at the wagering game server, that the wagering game system account associated with the player has been awarded the system-wide game modifier; and modifying the wagering game based on predefined game modification specifications associated with the wagering game and the system-wide game modifier.

In some embodiments, said modifying the wagering game based on the predefined game modification specifications associated with the wagering game and the system-wide game modifier comprises modifying game content and/or game outcomes of the wagering game based on the predefined game modification specifications associated with the wagering game and the system-wide game modifier.

In some embodiments, the method further comprises monitoring, at the wagering game server, the player's system-wide gaming activity; awarding, at the wagering game server, system-wide gaming activity points to the player's wagering game system account based on the player's system-wide gaming activity; determining, at the wagering game server, whether to award a system-wide game modifier to the player based on whether the player's system-wide gaming activity point total exceeds a system-wide gaming activity point threshold; and awarding the player's wagering game system account the system-wide game modifier in response to determining that the player's system-wide gaming activity point total exceeds the system-wide gaming activity point threshold.

In some embodiments, in response to awarding the system-wide game modifier to the player while the player is participating in the wagering game system via a physical casino, revealing to the player how one or more online games will be modified based on the system-wide game modifier if the player participates in the wagering game system via an online casino or a virtual gaming community website, and in response to awarding the system-wide game modifier to the player while the player is participating in the wagering game system via an online casino or a virtual gaming community website, revealing to the player how one or more in-casino games will be modified based on the system-wide game modifier if the player participates in the wagering game system via one or more physical casinos.

In some embodiments, said determining, at the wagering game server, whether to award a system-wide game modifier to the player based on whether the player's system-wide gaming activity point total exceeds a system-wide gaming activity point threshold comprises determining to award the player's wagering game system account a first level system-wide game modifier if the player's system-wide gaming activity point total exceeds a first system-wide gaming activity point threshold; determining to award the player's wagering game system account a second level system-wide game modifier if the player's system-wide gaming activity point total exceeds a second system-wide gaming activity point threshold; and determining to award the player's wagering game system account a third level system-wide game modifier if the player's system-wide gaming activity point total exceeds a third system-wide gaming activity point threshold.

In some embodiments, said modifying the selected wagering game based on predefined game modification specifications associated with the selected wagering game and the system-wide game modifier comprises modifying the selected wagering game based on a first set of predefined game modification specifications if the player's wagering game system account has been awarded a first level system-wide game modifier; modifying the selected wagering game based on a second set of predefined game modification specifications if the player's wagering game system account has been awarded a second level system-wide game modifier; and modifying the selected wagering game based on a third set of predefined game modification specifications if the player's wagering game system account has been awarded a third level system-wide game modifier.

In some embodiments, a wagering game server of a wagering game system, the wagering game server comprising means for determining system-wide gaming activity associated with a player; means for awarding system-wide gaming activity points to a wagering game system account associated with the player based on the player's system-wide gaming activity; means for determining whether to award a system-wide game modifier to the player based on whether the player's system-wide gaming activity point total exceeds a system-wide gaming activity point threshold; means for awarding the player's wagering game system account the system-wide game modifier in response to determining that the player's system-wide gaming activity point total exceeds the system-wide gaming activity point threshold; means for determining when the player selects a wagering game for play via the wagering game system; means for determining that the player's wagering game system account has been awarded the system-wide game modifier; and means for modifying the wagering game based on predefined game modification specifications associated with the wagering game and the system-wide game modifier.

In some embodiments, said means for modifying the wagering game based on predefined game modification specifications associated with the wagering game and the system-wide game modifier comprises means for modifying game content and/or game outcomes of the wagering games based on predefined game modification specifications associated with the wagering game and the system-wide game modifier.

In some embodiments, said means for determining whether to award a system-wide game modifier to the player based on whether the player's system-wide gaming activity point total exceeds a system-wide gaming activity point threshold comprises means for determining to award the player's wagering game system account a first level system-wide game modifier if the player's system-wide gaming activity point total exceeds a first system-wide gaming activity point threshold; means for determining to award the player's wagering game system account a second level system-wide game modifier if the player's system-wide gaming activity point total exceeds a second system-wide gaming activity point threshold; and means for determining to award the player's wagering game system account a third level system-wide game modifier if the player's system-wide gaming activity point total exceeds a third system-wide gaming activity point threshold.

In some embodiments, one or more machine-readable storage media, having instructions stored therein, which, when executed by one or more processors causes the one or more processors to perform operations that comprise determining that a wagering game system account associated with a player should be awarded a system-wide game modifier based on the player's system-wide gaming activity in a wagering game system; determining when the player selects each wagering game of a plurality of wagering games selected by the player for play via the wagering game system; for each wagering game of the plurality of wagering games selected by the player in the wagering game system determining that the wagering game system account associated with the player has been awarded the system-wide game modifier; and modifying the selected wagering game based on game modification specifications associated with the selected wagering game and the system-wide game modifier.

In some embodiments, said operation of modifying the selected wagering game based on predefined game modification specifications associated with the selected wagering game and the system-wide game modifier comprises modifying game content and/or game outcomes of the selected wagering games based on predefined game modification specifications associated with the selected wagering game and the system-wide game modifier.

In some embodiments, the operations further comprise monitoring the player's system-wide gaming activity; awarding system-wide gaming activity points to the player's wagering game system account based on the player's system-wide gaming activity; determining whether to award a system-wide game modifier to the player based on whether the player's system-wide gaming activity point total exceeds a system-wide gaming activity point threshold; and awarding the player's wagering game system account the system-wide game modifier in response to determining that the player's system-wide gaming activity point total exceeds the system-wide gaming activity point threshold.

BRIEF DESCRIPTION OF THE FIGURES

Embodiments are illustrated in the Figures of the accompanying drawings in which:

FIGS. 4A-4C are tables illustrating examples of criteria for earning system-wide game modifiers in a wagering game system, according to some embodiments;

DESCRIPTION OF THE EMBODIMENTS

This description of the embodiments is divided into five sections. The first section provides an introduction to some embodiments, while the second section describes example wagering game machine architectures. The third section describes example operations performed by some embodiments and the fourth section describes example wagering game machines in more detail. The fifth section presents some general comments.

Introduction

This section provides an introduction to some embodiments.

Wagering game systems offer wagering game players ("players") entertainment value and the opportunity to win monetary value. In various embodiments, wagering game systems can try to enhance the gaming experience by providing players the opportunity to earn system-wide game modifiers for wagering games in the wagering game system. A system-wide game modifier is a persistent system level award or achievement that can be earned by a player based on the player's system-wide gaming activity, as will be further described below with reference to FIGS. 1-5. A system-wide game modifier can enhance a player's gaming experience by modifying game content or other game characteristics in a variety of in-casino and/or online wagering games available via the wagering game system. In other words, a single system-wide game modifier earned by the player can enhance the player's gaming experience in various wagering games offered online and/or in a physical casino. In addition to wagering games, a system-wide game modifier can also enhance in-casino and/or online non-wagering games and other gaming applications offered to players of the wagering game system (e.g., games and other gaming applications offered via a virtual gaming community website), as will be further described below with reference to FIGS. 1-5. System-wide game modifiers can encourage players that play wagering games at one or more physical casinos to continue playing games online or access other online community gaming applications when the players leave the physical casinos. System-wide game modifiers can also encourage players to return to the physical casinos when the players play online games and/or participate in the virtual gaming community service.

Figure 1:
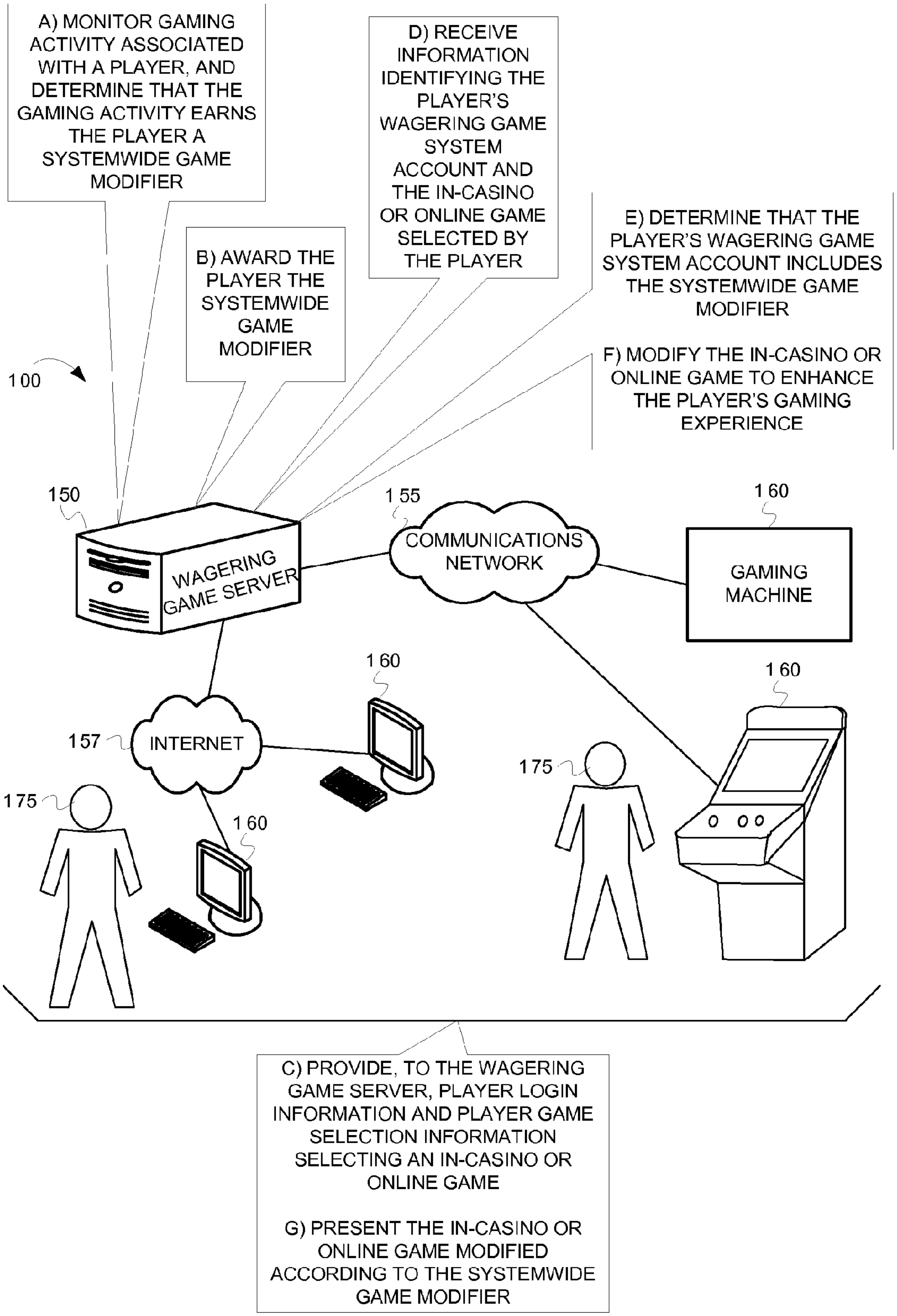
FIG. 1 is a conceptual diagram illustrating an example mechanism for awarding and implementing system-wide game modifiers in a wagering game system, according to some embodiments.

FIG. 1 is a conceptual diagram illustrating an example mechanism for awarding and implementing system-wide game modifiers in a wagering game system, according to some embodiments. In the example shown in FIG. 1, the wagering game system ("system") 100 includes a wagering game server 150 connected to one or more wagering game machines ("gaming machines") 160 via a communications network 155 (e.g., a local area network (LAN), wireless LAN (WLAN), etc.). The wagering game server 150 is also connected to other gaming machines 160 via the Internet 157.

In some embodiments, the wagering game system 100 can offer players the option to play wagering games in one or more physical casinos (i.e., brink and mortar casinos) and in one or more online casinos (via the Internet). The wagering game system 100 may also offer players the option to join a virtual gaming community service. Within the virtual gaming community service, each player can create a virtual gaming community profile and identity, which can be tied to the player's wagering game system account. For example, the player can create and customize an avatar for the player's profile. The player can also access various non-wagering games and other game-related applications via an online virtual gaming community website. For example, in the virtual gaming community website, the player can play various non-wagering games that have similar characteristics (e.g., themes, game elements, etc.) as wagering games offered in the physical and/or online casinos. The virtual gaming community website can also offer unique non-wagering games that are not offered anywhere else in the wagering game system 100. The virtual gaming community website may allow players to conveniently access the online casinos offered in the wagering game system 100. Furthermore, the virtual gaming community website can offer other gaming-related applications and features for players of the wagering game system 100. For example, the virtual gaming community website can offer players virtual gaming community chat, forums, personalization options, tournaments, message boards, promotions, special events, news, surveys, and various other types of gaming-related applications and features.

In one implementation, at stage A, the wagering game server 150 monitors gaming activity associated with a player 175, and determines that gaming activity earns the player 175 a system-wide game modifier. In one example, the wagering game server 150 monitors the gaming activity associated with the player's wagering game system account. The wagering game server 150 can track all of the player's gaming activity online (e.g., in an online casino and in a virtual gaming community website) and in one or more physical casinos that are part of the wagering game system 100 by detecting identification information associated with the player's wagering game system account. The identification information may include login information (e.g., username, password, player card information, biometric information, etc.), account number, and/or other information used for uniquely verifying the identity of a player and locating the player's wagering game system account when the player accesses the wagering game system 100 (e.g., via an in-casino or online gaming machine 160).

The player's gaming activity in the wagering game system 100 may include one or more of the following categories of system-wide gaming activity: total amount of money wagered (e.g., "coin-in"), total number of wagering games played, total amount of money won in wagering games, total balance in the player's wagering game system account, total number of non-monetary game points or credits earned, number and type of non-monetary awards or achievements won (e.g., trophies and other achievements), participation within the virtual gaming community system (e.g., via the online gaming community website), and various other gaming related activities that can serve as indicators of a player's participation, performance, and/or achievements in the wagering game system 100. The total number of non-monetary game points or credits earned may include non-monetary game credits won in a casino for certain types of bonus games or other types of in-casino non-wagering games (e.g., skill-based games), and/or non-monetary game credits won for playing non-wagering games offered via the online gaming community website. The number and type of non-monetary awards or achievements won may include the number and type of game-specific awards or achievements won that are specific to certain games the player has played in the system 100. For example, the player may have earned a silver trophy that is indicative of the player's achievement in game A, a gold trophy that is indicative of the player's achievements in game B, and 3 game-specific accessories (e.g., a sword, armor, and shield, or 3 gold medals) that are indicative of the player's performance and progression in a game C. The player's participation within the virtual gaming community system may include various activities that show a player's involvement within the virtual gaming community, such as the number of times the player uses the virtual gaming community chat application (either in the casino or online), the number of times the player plays mini-games or the player's performance in the mini-games, the number of times the player refers friends to join the virtual gaming community, the player completing or adding on to the player's profile (which may serve as the player's identity within the virtual gaming community), the player creating and customizing their virtual gaming community persona (e.g., avatar), the player participating in surveys about available games or pre-released games, the player posting in a virtual gaming community forum or moderating the virtual gaming community forum, the number of times the player uses other virtual gaming community applications, and various other activities within the virtual gaming community service.

The operator of the wagering game system 100 can set criteria defining when players earn system-wide game modifiers based on one or more of these categories of system-wide gaming activities. In this manner, the operator of the wagering game system 100 can control the exclusiveness and rarity of the system-wide game modifiers. The operator of the wagering game system 100 can also have the flexibility to modify the criteria for awarding system-wide game modifiers to maintain a desired level of exclusiveness and rarity.

In one embodiment, the wagering game system 100 can award different types or levels of system-wide game modifiers. For example, the wagering game system 100 can award level 1, level 2, and level 3 system-wide game modifiers, or silver, gold, platinum system-wide game modifiers. Each type or level of system-wide game modifiers can have a different level of exclusiveness or rarity. In other words, the criteria for earning some system-wide game modifiers can be more difficult to meet than the criteria for earning other system-wide game modifiers. For example, it may be more difficult to earn a platinum system-wide game modifier than a gold system-wide game modifier. It is noted, however, that the wagering game system 100 can implement any suitable number of types or levels of system-wide game modifiers, as will be further described below with reference to FIG. 3. In another embodiment, the wagering game system 100 can award a single type or level of system-wide game modifier. If a single type or level of system-wide game modifier is available, the manner in which the system-wide game modifier modifies the game and/or the benefit the system-wide game modifier provides to the player can vary based on other criteria, such as the player's status level within the wagering game system 100, the player's game-specific achievements (e.g., trophies), and/or the game-specific level the player is currently playing in, etc.

In one embodiment, the wagering game server 150 can implement a system-wide gaming activity point system that awards gaming activity points to each player based on the player's gaming activity within the wagering game system 100. The wagering game server 150 can utilize the system-wide gaming activity point system to determine when the player earns a system-wide game modifier. The wagering game server 150 can award gaming activity points for each of the system-wide gaming activity categories described above. For example, the wagering game server 150 can award a predefined number of gaming activity points for the total amount of money wagered in the wagering game system 100 (e.g., one gaming activity point for each dollar wagered), for the total amount of money won (e.g., one gaming activity point for every two dollars won), for the total number of non-monetary game credits earned (e.g., one gaming activity point for every four game credits earned), for the number and type of non-monetary awards won (e.g., 100 gaming activity points for a silver trophy won in game A, 250 gaming activity points for a gold trophy won in game A, 50 gaming activity points for a silver trophy won in game B, etc.), for the player's participating within the virtual gaming community (e.g., 2 gaming activity points each time the player uses a chat application, 5 gaming activity points each time the player posts in a forum, 5 points each time the player plays a mini-game, 10 gaming activity points for each friend the player refers to the virtual gaming community service, etc.). The wagering game server 150 can automatically award system-wide game modifiers when the player earns a predefined number of system-wide gaming activity points, as will be further described below with reference to FIG. 3. For example, when the wagering game system 100 implements three levels of system-wide game modifiers, the wagering game server 150 can determine when the player's system-wide gaming activity points total reaches one of three predefined activity point thresholds to award each level of system-wide game modifier. It is noted that although in one implementation the wagering game server 150 can award system-wide gaming activity points, in other implementations the wagering game server 150 can award system-wide gaming activity medals, stars, coins, or other graphical representations of the system-wide gaming activity points the player has earned. In another implementation, the wagering game server 150 may not automatically award the system-wide game modifiers, but instead the player can use the system-wide gaming activity points the player has earned as a form of currency to obtain (i.e., "buy") system-wide game modifiers. In another embodiment, instead of or in addition to awarding system-wide game modifiers based on the system-wide gaming activity point system, the wagering game server 150 can award system-wide game modifiers based on the player achieving or meeting certain predefined combinations of game-specific objectives (e.g., earning certain combinations of game-specific non-monetary awards, such as trophies or other achievements), as will be further described below with reference to FIG. 3. For example, the wagering game server 150 can award a system-wide game modifier if the player earns gold trophies in each of 5 different wagering games. In another example, the wagering game server 150 can award a system-wide game modifier if the player earns gold trophies in each of 3 different wagering games, reaches level 20 in the non-wagering game A offered via the virtual gaming community website, and reaches level 15 in the non-wagering game B offered via the virtual gaming community website. In some implementations, the wagering game server 150 may not reveal to players what combinations of game-specific awards/achievements or other objectives (either in-casino or online) earn players system-wide game modifiers. This can help to maintain player interest in the games, and encourage players to interact within the virtual gaming community service to share tips about earning system-wide game modifiers and share other gaming experiences. It is noted, however, that in other embodiments the wagering game system 100 can award system-wide game modifiers based on other criteria, e.g., as will be further described below with reference to FIGS. 3-5.

At stage B, the wagering game server 150 awards a system-wide game modifier to the player based on the player's gaming activity. In one embodiment, the wagering game server 150 awards the player a system-wide game modifier by associating the player's wagering game system account with the system-wide game modifier. In other words, the wagering game server 150 can store an indication that the player has earned the system-wide game modifier in the player's wagering game system account (e.g., set one or more bits in the player's wagering game system account). In one example, the wagering game server 150 can also store a visual or graphical indicator in the profile of the player's wagering game system account. For example, the wagering game server 150 can provide the player a special avatar for the profile, a special accessory for the player's existing avatar (e.g., a crown, wings, or background), or other graphical indicator. The player's profile can be accessible by all members of the virtual gaming community. Therefore, in addition to enhancing the player's gaming experience, having the graphical indicator of the system-wide game modifier may serve to improve the player's status within the virtual gaming community.

After earning the system-wide game modifier, the wagering games (and, in some cases, the non-wagering games) the player 175 plays via the wagering game system 100 (either at one or more physical casinos, one or more online casinos, or the virtual gaming community service) will be modified based on the system-wide game modifier to improve the player's gaming experience (e.g., as will be further described below in Stages C-F).

At stage C, the gaming machine 160 located in a casino provides the player's login information and game selection information to the wagering game server 150. In one example, the player 175 may provide login information (e.g., username, password, player card information, biometric information, etc.) to login to the system 100, and then select the first wagering game on a display of the gaming machine 160. In another example, if the player 175 is at home, the player 175 can similarly login to an online casino and/or the virtual gaming community website.

At stage D, the wagering game server 150 receives information identifying the wagering game system account associated with the player 175, and information identifying the first wagering game the player selected at the gaming machine 160. For example, the wagering game server 150 may receive a message including the player's login information that can be used to identify the player's wagering game server account. Also, the wagering game server 150 may receive a message including a game ID or other type of information identifying the first wagering game the player 175 selected at the gaming machine 160.

At stage E, the wagering game server 150 determines that the player's wagering game system account includes the system-wide game modifier. For example, after the wagering game server 150 identifies the player's wagering game system account (e.g., using the player's login information), the wagering game server 150 detects an indication in the player's wagering game server account that the player 175 has earned a system-wide game modifier. The indication in the player's wagering game server account can also specify what type or level of system-wide game modifier the player has earned. For example, the wagering game server 150 can read one or more bits in the player's wagering game account that are used as indicators of different types or levels of system-wide game modifiers.

At stage F, in response to determining the player's wagering game system account includes the system-wide game modifier, the wagering game server 150 modifies the first wagering game to enhance the player's gaming experience. The wagering game server 150 modifies the first wagering game according to predefined game modification specifications associated with the first wagering game and the system-wide game modifier the player 175 has earned. In one embodiment, game developers, the virtual community gaming website developers, and/or the system operator determine and define the game modification specifications associated with each game and gaming-related applications for each specific type or level of system-wide game modifier. For example, the game developer of a wagering game A can define game modification specifications associated with the wagering game A for a level 1 system-wide game modifier, game modification specifications associated with the wagering game A for a level 2 system-wide game modifier, and game modification specifications associated with the wagering game A for a level 3 system-wide game modifier. In one embodiment, the wagering game server 150 can modify the game (selected by the player) according the predefined game modification specifications by configuring various game play elements associated with the game; for example, configuring game play elements, such as executable game code, lookup tables, configuration files, audio or visual representations of the game, game assets, or the like. In one example, in a server-based system such as the wagering game system 100, the wagering game server 150 can modify the game selected by the player according to the predefined game modification specifications associated with the game and the system-wide game modifier earned by the player. The wagering game server 150 can then provide the modified game play elements and/or the modified game content to the gaming machine 160 for presentation to the player. It is noted, however, that in some embodiments the wagering game server 150 can cause some aspects of the game to be modified at the gaming machine 160 where the player logged in (e.g., a gaming machine 160 at a physical casino) by providing an indication to the gaming machine 160 that the player has earned a system-wide game modifier and the type or level of system-wide game modifier.

The wagering and non-wagering games offered via the wagering game system 100 (e.g., at one or more physical casinos, one or more online casinos, or the virtual gaming community website) can be modified in a variety of ways specified by the predefined game modification specifications. For example, the games can be modified by changing the "look and feel" of the games, such as changing the background design, theme, the color scheme, audio/visual presentations, etc. In another example, the games can be modified by changing the game content of the games, such as offering the player new game content (e.g., providing the player a new dragon in a dragon game), or offering the player new accessories for the game content (e.g., new type of wings for the dragon in the dragon game). The new game content or the new accessories for the game content can provide players actual benefits (e.g., a stronger and/or faster dragon that can win more monetary or non-monetary awards), and/or provide players perceived benefits (the perception of a faster and/or stronger dragon or other improved "look and feel" attributes). In another example, the games can be modified to offer new bonus games (or other types of secondary games), offer extra bonus games, or increase the frequency that bonus games are awarded to players. In another example, the games can be modified such that other game content or game experiences can be unlocked (e.g., new game characters, new customization options, new game obstacles, new game levels, new game fighting moves, new game weapons, new health and/or skill power-ups, etc.). In other examples, the games can be modified such that the math associated with the games is modified for the player's benefit. For example, the math associated with the games can be modified such that the player has a higher probability of winning monetary and/or non-monetary awards each round of the wagering game, the player wins extra monetary and/or non-monetary awards each time the player wins, and/or the player is provided other benefits (e.g., the player is provided a free round of the game for every 20 rounds the player plays, the player's bet amount is automatically increased to a maximum bet amount every 10 rounds the player plays, the player's win amount is increased by 10% (or any other suitable percentage) for every win, etc.). It is noted, however, that in other embodiments the games can be modified in various other ways to enhance the player's gaming experience (e.g., by improving the "look and feel" of the games, by providing actual or perceived benefits, etc.). It is further noted that various gaming-related applications (e.g., chat, forums, avatars, mini-games, etc.) offered via the virtual gaming community website can also be modified similarly as was described above for wagering and non-wagering games (e.g., changing the "look and feel" of chat applications or mini-games, offering new accessories for the player's avatar, etc.) if the player has earned a system-wide game modifier.

As described above, in one embodiment, each wagering and non-wagering game can include predefined game modification specifications for different types or levels of system-wide game modifiers. In one example, if the wagering game system 100 implements a tiered structure with three levels of system-wide game modifiers, each game can have predefined game modification specifications for each of the three levels of system-wide game modifiers. For example, for a slots wagering game with a dragon theme (which may also include one or more bonus game with a dragon theme), when the player has earned a level 1 system-wide game modifier, the wagering game server 150 can modify the game such that the game's dragon avatar has a shiny metallic blue armor. When the player has earned a level 2 system-wide game modifier, the wagering game server 150 can modify the game such that the dragon has aerodynamic carbon fiber wings. When the player has earned a level 3 system-wide game modifier, the wagering game server 150 can modify the game to offer the player a new level of the game or a new bonus game. It is noted, however, that the wagering game server 150 can modify games in various other ways, as will be further described below with reference to FIGS. 3-5.

At stage G, the gaming machine 160 at the casino presents the first wagering game to the player modified according to the system-wide game modifier. In another example, if the player is at home, the modified game can also be presented to the player via an online casino or the virtual gaming community website.

As described above, in some embodiments, the system-wide game modifiers are persistent, i.e., the system-wide game modifiers that are earned by players are not consumed and can be used to modify a variety of different in-casino and online games across the system 100 an unlimited number of times. In one example, players can keep the system-wide game modifiers in their account regardless of whether there are long periods of inactivity in the system 100. In some examples, the system 100 may require players to maintain a certain level of game play activity each year, or every three years, to keep the system-wide game modifiers. For example, when the system 100 implements the system-wide gaming activity points, the system 100 may require the player to earn at least a predefined number of system-wide gaming activity points per year (e.g., 50 points per year), or a predefined average number of system-wide gaming activity points per year over a period of three years.

It is noted that the in-casino or online wagering and non-wagering games that are modified according to the system-wide game modifiers may include a base (or "primary") wagering game and/or one or more associated secondary wagering games. A base wagering game may include the main wagering games that players play for entertainment and the opportunity to win monetary and/or non-monetary awards, e.g., slots, video poker, video blackjack, video roulette, etc. The base wagering game may be associated with one or more secondary games (e.g., bonus games, side games, etc.) that complement or supplement the wagering game (e.g., triggered by certain game events in the base game), provide additional entertainment value, and also offer players additional opportunities to win monetary and/or non-monetary awards.

In some embodiments, besides the virtual gaming community service that is offered online to players, the wagering game system 100 can comprise one or more physical casinos and/or one or more online casinos (across one or more states, regions, or countries) that offer wagering and/or non-wagering games from a specific game developer/manufacturer (or group of developers/manufacturers). In some embodiments, besides the virtual gaming community service that is offered online to players, the wagering game system 100 can comprise one or more physical casinos and/or one or more online casinos (across one or more states, regions, or countries) that are owned by or affiliated with a single entity (e.g., corporation, partnership, individual, etc.), or by a group entities.

Although FIG. 1 describes some embodiments, the following sections describe many other features and embodiments.

Operating Environment

This section describes example operating environments and networks and presents structural aspects of some embodiments. More specifically, this section includes discussion about wagering game system architectures.

Wagering Game System Architectures

Figure 2:
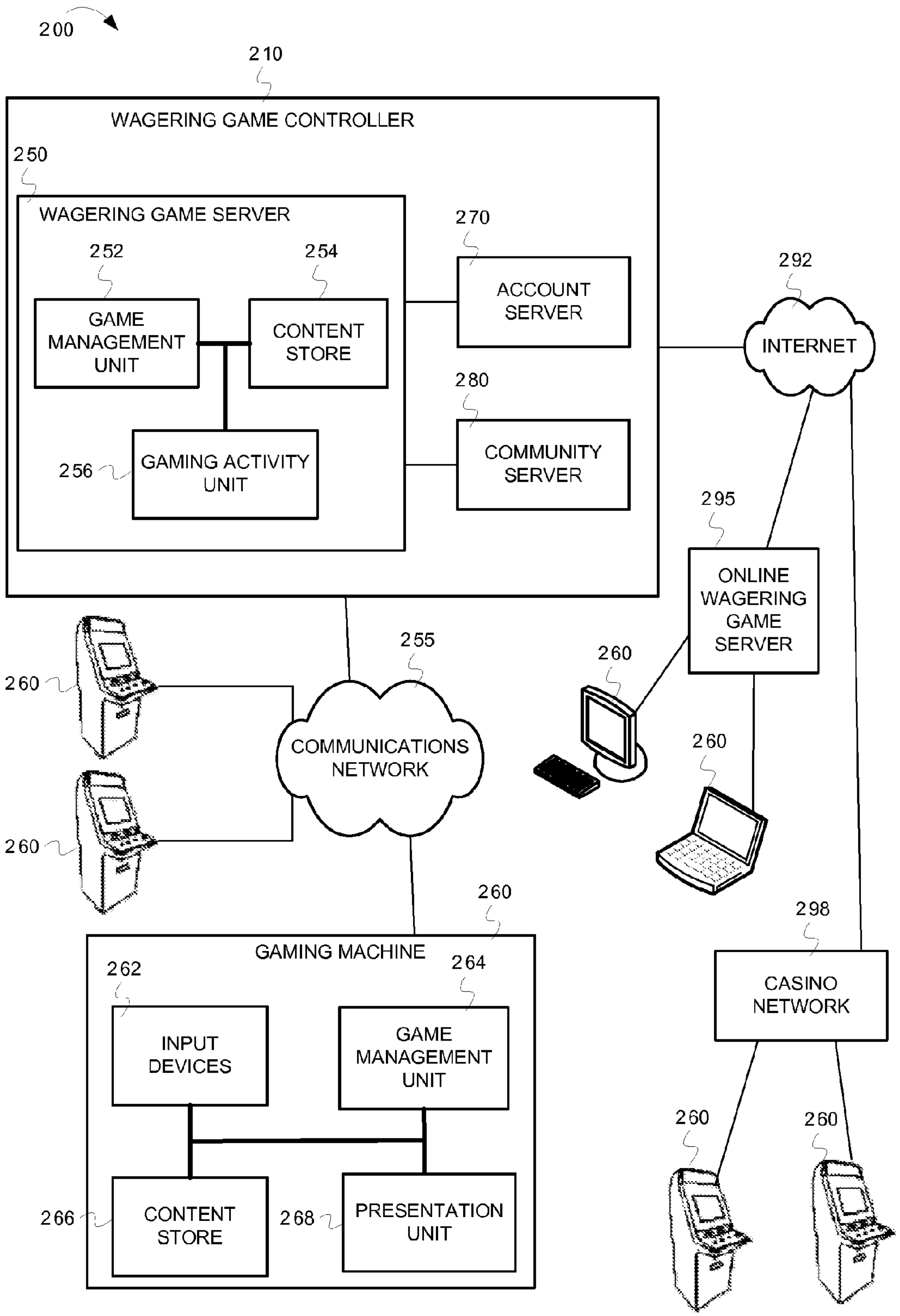
FIG. 2 is a conceptual diagram that illustrates an example of a wagering game system architecture, according to some embodiments.

FIG. 2 is a conceptual diagram that illustrates an example of a wagering game system architecture 200, according to some embodiments. As illustrated, the wagering game system architecture 200 includes a wagering game controller 210 and a plurality of gaming machines 260. The wagering game controller 210 is configured to control game content (e.g., game elements, game updates, game results, etc.) and communicate game-related information and other information (e.g., virtual gaming community services) to and from the plurality of gaming machines 260. In one example, the wagering game controller 210 includes a wagering game server 250, an account server 270, and a community server 280. The wagering game controller 210 may be configured to communicate with other systems, devices, and networks. For example, the wagering game controller 210 may be configured to communication with one or more additional physical casinos (e.g., casino network 298), and/or one or more online wagering game servers that host and manage online casinos (e.g., online wagering game server 295). For example, the wagering game controller 210 can communicate with the casino network 298 and the online wagering game server 295 to monitor a player's system-wide gaming activity and determine when the player earns a system-wide game modifiers, and to modify games and gaming-related applications when the player has earned a system-wide game modifier (e.g., as described herein with reference to FIG. 1 and FIGS. 3-5).

The wagering game server 250 is configured to manage and control content for presentation on the gaming machines 260. As illustrated, in some embodiments, the wagering game server 250 includes a game management unit 252 configured to manage game content and provide (e.g., stream) game content and other game-related information to the gaming machines 260. The game management unit 252 is configured to generate (e.g., using a random numbers generator) game results (e.g., win/loss values), including win amounts, for wagering games played on the gaming machines 260. The game management unit 252 can communicate the game results to the gaming machines 260 via the network 255. In some embodiments, the game management unit 252 can also generate random numbers and provide them to the gaming machines 260 so that the gaming machines 260 can generate game results. The wagering game server 250 can also include a content store 254 configured to store content used for presenting wagering and non-wagering games (e.g., base games, secondary bonus games, etc.) and other game-related information associated with games presented on the gaming machines 260 of the system 200. The wagering game server 250 can also include a gaming activity unit 256 configured to monitor the system-wide gaming activity of players and determine when the players have earned system-wide game modifiers, as described herein with reference to FIG. 1 and FIGS. 3-4. The game management unit 252 is also configured to modify wagering and non-wagering games played by the players according to game modification specifications associated with system-wide game modifiers, as described herein with reference to FIGS. 1 and 5.

The account server 270 is configured to control player-related accounts accessible via the wagering game system 200. The account server 270 can manage player financial accounts (e.g., performing funds transfers, deposits, withdrawals, etc.) and player information (e.g., avatars, screen name, account identification numbers, social contacts, financial information, etc.). The account server 270 can also provide auditing capabilities, according to regulatory rules, and track the performance of players, machines, and servers. In some examples, the account server 270 can also manage non-monetary game credits for player wagering game system accounts. The account server 270 can include an account controller configured to control information for player wagering game system accounts. The account server 270 can also include an account store configured to store information for player wagering game system accounts.

The community server 280 is configured to provide a wide range of services to members of virtual gaming communities. For example, the community server 280 may allow players to:

Create Social Networks—When creating social networks, members can create electronic associations that inform network members when selected members are: 1) online, 2) performing activities, 3) reaching milestones, 4) etc.

Establish a Reputation—Community members can establish reputations based on feedback from other community members, based on accomplishments in the community, based on who is in their social network, etc.

Provide Content—Community members can provide content by uploading media, designing wagering games, maintaining blogs, etc.

Filter Content—Community members can filter content by rating content, commenting on content, or otherwise distinguishing content.

Interact with Other Members—Community members can interact via newsgroups, chat, e-mail, discussion boards, instant messaging, etc.

Participate in Community Activities—Community members can participate in community activities, such as multiplayer games, interactive meetings, discussion groups, real-life meetings, etc.

Connect Casino Players to Online Members—Community members who are playing in casinos can interact with members who are online. For example, online members may be able to: see activities of social contacts in the casino, chat with casino players, participate in community games involving casino players, etc.

In some embodiments, the community server 280 enables online community members (e.g., operating a personal computer (PC) or a mobile device) to participate in and/or monitor wagering games that are being presented in one or more casinos. The community server 280 can enable community members to connect with and track each other. For example, the community server 280 can enable community members to select other members to be part of a social network. The community server 280 can also enable members of a social network to track what other social network members are doing in a virtual gaming community and a real-world casino. For example, in some implementations, the community server 280 assists in enabling members of a social network to see when network members are playing wagering game tables and machines in a casino, accessing a virtual gaming community web site, achieving milestones (e.g., winning large wagers in a casino), etc.

The community server 280 can store and manage content for a virtual gaming community. For example, in some embodiments, the community server 280 can host a web site for a virtual gaming community. Additionally, the community server 280 can enable community members and administrators to add, delete, and/or modify content for virtual gaming communities. For example, the community server 280 can enable community members to post media files, member-designed games, commentaries, etc., all for consumption by members of a virtual gaming community.

The community server 280 can track behavior and gaming activity of community members. In some embodiments, the community server 280 tracks how individuals and/or groups use the services and content available in a virtual gaming community. The community server 280 can then report the gaming activity of each player to the wagering game server 150. The community server 280 can analyze member behavior and categorize community members based on their behavior. The community server 280 can configure network components to customize content based on individual and/or group habits.

The community server 280 can manage various promotions offered to members of a virtual gaming community. For example, the promotions community server 280 can distribute promotional material when members achieve certain accomplishments (e.g., scores for online games) in a virtual gaming community. Members may use some of the promotional material when playing wagering games in a casino.

The gaming machines 260 are configured to present wagering games and receive and transmit information (e.g., to/from the wagering game server 250) to control the content that is presented for the wagering games. The gaming machines 260 can include input devices 262, a wagering game unit 264, a content store 266, and a presentation unit 268. The input devices 262 may include buttons, joysticks, touch screens, cameras, etc., used to detect player input associated with wagering games. The wagering game unit 264 is configured to manage and control the game content that is presented on the gaming machine 260. The wagering game unit 264 can also provide game activity information to the wagering game server 250 in order for the wagering game server 250 to monitor each player's gaming activity. Furthermore, the wagering game unit 264 can generate game results based on random numbers received from the wagering game server 250, or may communicate with the wagering game server 250 to obtain the game results. The content store 266 is configured to store content that is presented on the wagering game machine 260. The presentation unit 268 is configured to control the presentation of the game content on the wagering game machine 260. The presentation unit 268 can include one or more browsers and any other software and/or hardware suitable for presenting audio and video content. It is noted, however, that in other implementations the game content can be presented using other display technologies.

The gaming machines described herein (e.g., gaming machines 260) can take any suitable form, such as floor standing models, handheld mobile units, bar-top models, workstation-type console models, surface computing machines, etc., and can access a communication network 255 to communication with the wagering game controller 210 via a wireless or wired connection. Further, gaming machines can be primarily dedicated for use in conducting wagering games, or can include non-dedicated devices, such as personal computers (PC), mobile phones, personal digital assistants (PDAs), laptop computers, etc. For example, the non-dedicated devices can provide players access to wagering games via a wireless network within a physical casino, or remotely via the Internet.

In some embodiments, each of the gaming machines 260 and the wagering game server 250 are configured to work together such that the gaming machine 260 can be operated as a thin, thick, or intermediate client. For example, one or more elements of game play may be controlled by the gaming machine 260 (client) or the wagering game server 250 (server). Game play elements can include executable game code, lookup tables, configuration files, game results, audio or visual representations of the game, game assets or the like. In a thin-client example, the wagering game server 250 can perform functions such as determining game results or managing assets, while the gaming machine 260 can present an audible/graphical representation of such outcome or asset modification to the players. In a thick-client example, the gaming machine 260 can determine game outcomes and communicate the outcomes to the wagering game server 250 for recording or managing a player's wagering game system account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Each component shown in the wagering game system architecture 200 is shown as a separate and distinct element connected via the communications network 255. However, some functions performed by one component could be performed by other components. For example, the wagering game server 250 can be configured to perform some or all of the functions of the account server 270, and/or the game management unit 252 can be configured to perform some or all of the functions of the gaming activity unit 256. Furthermore, the components shown may all be contained in one device, but some, or all, may be included in, or performed by multiple devices, as in the configurations shown in FIG. 2 or other configurations not shown, e.g., the gaming activity unit 256 can be distributed across the wagering game server 250 and the gaming machines 260. Furthermore, the wagering game system architecture 200 can be implemented as software, hardware, any combination thereof, or other forms of embodiments not listed. For example, any of the network components (e.g., the wagering game tables, machines, servers, etc.) can include hardware and machine-readable media including instructions for performing the operations described herein. Machine-readable media includes any mechanism that provides (i.e., stores and/or transmits) information in a form readable by a machine (e.g., a wagering game table, machine, computer, etc.). For example, tangible machine-readable storage media includes read only memory (ROM), random access memory (RAM), magnetic disk storage media, optical storage media, flash memory machines, and other types of tangible medium suitable for storing instructions. Machine-readable transmission media includes any media suitable for transmitting software over a network.

Although FIG. 2 describes some embodiments, the following sections describe many other features and embodiments.

Example Operations

This section describes operations associated with some embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
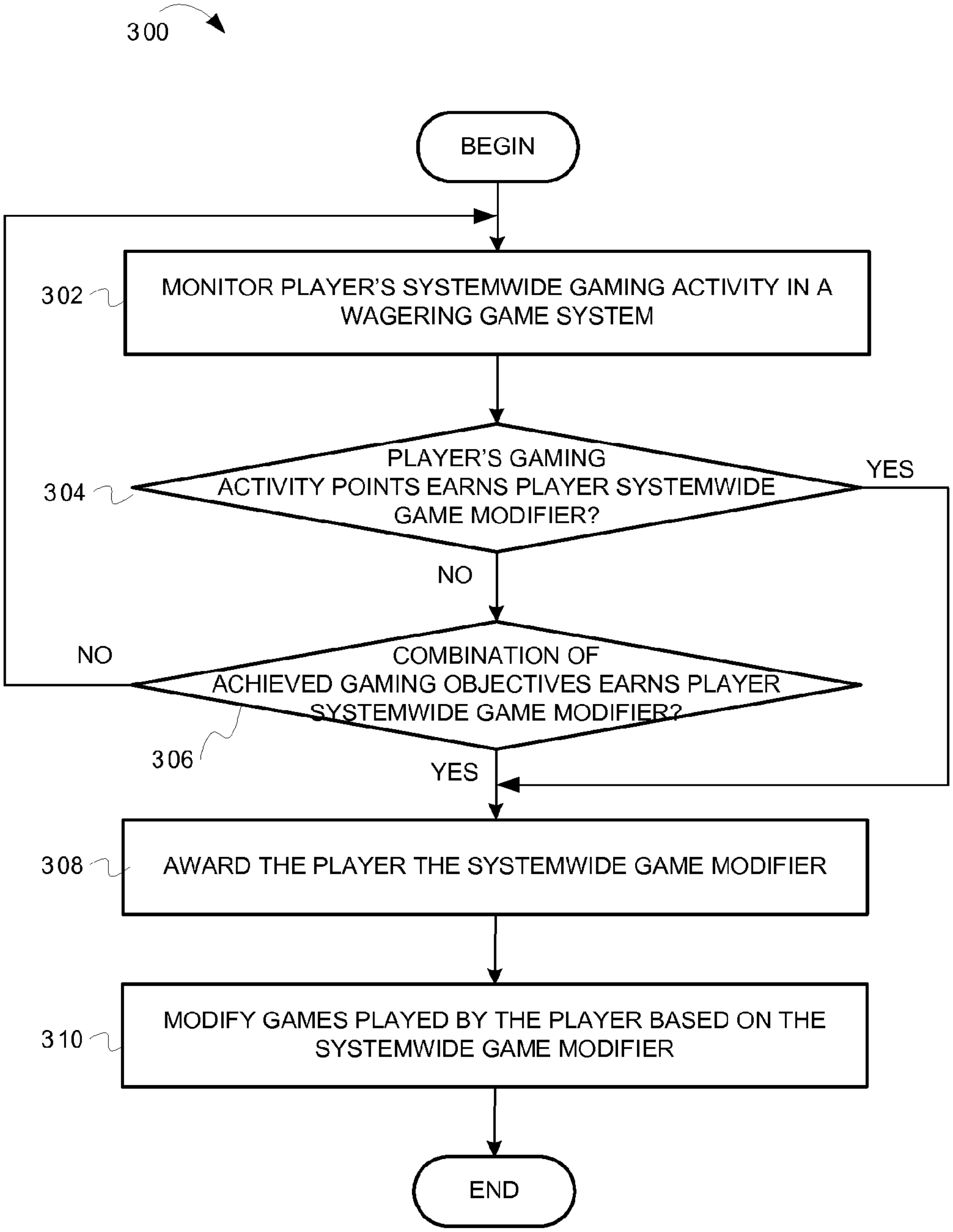
FIG. 3 is a flow diagram illustrating operations for determining whether a player has earned a system-wide game modifier based on the player's system-wide gaming activity in a wagering game system, according to some embodiments.
Figure 5:
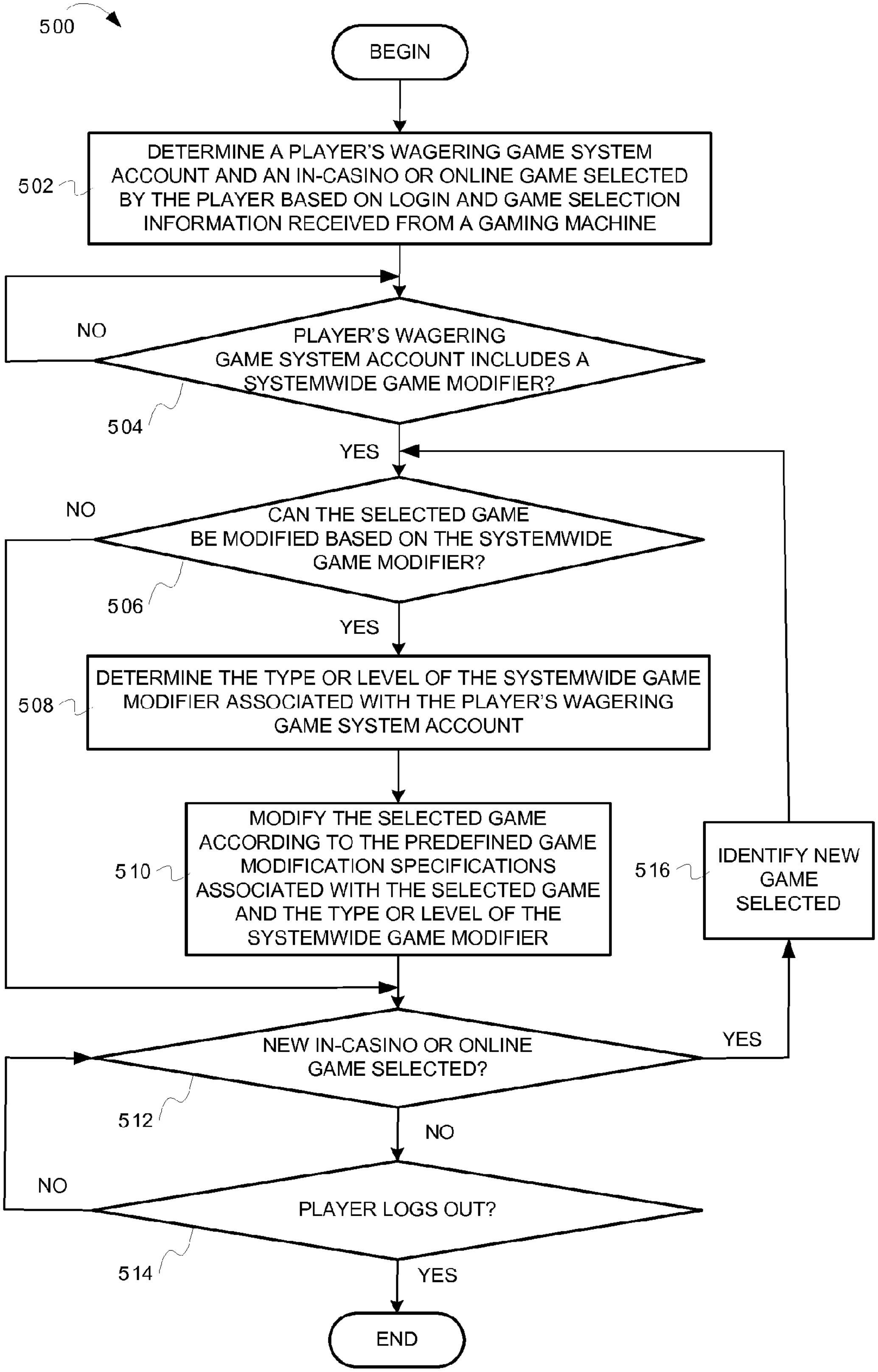
FIG. 5 is a flow diagram illustrating operations for implementing system-wide game modifiers in a wagering game system, according to some embodiments.

The following discussion of FIGS. 3-4 describes example mechanisms for determining whether a player of a wagering game system has earned one or more system-wide game modifiers. FIG. 5 describes example mechanisms for modifying games played by the player of the wagering game system, based on the system-wide game modifiers awarded to the player, to enhance the player's gaming experience.

FIG. 3 is a flow diagram ("flow") 300 illustrating operations for determining whether a player has earned a system-wide game modifier based on the player's system-wide gaming activity in a wagering game system, according to some embodiments. The flow of 300 will be described with reference to the example system architecture of FIG. 2. The flow diagram begins at block 302.

At block 302, the wagering game server 250 monitors a player's gaming activity in the wagering game system 200. For example, the gaming activity unit 256 of the wagering game server 250 monitors the player's gaming activity in one or more physical casinos, one or more online casinos, and/or a virtual gaming community website associated with the wagering game system 200. As described above with reference to FIG. 1, the player's gaming activity in the wagering game system 200 may include one or more of the following categories of system-wide gaming activity: total amount of money wagered (e.g., “coin-in”), total number of wagering games played, total amount of money won in wagering games, total balance in the player’s wagering game system account, total number of non-monetary game points or credits earned, number and type of non-monetary awards or achievements won (e.g., trophies and other achievements), participation within the virtual gaming community system (e.g., via the online gaming community website), and various other gaming related activities that can serve as indicators of a player’s participation, performance, and/or achievements in the wagering game system 200. As was described in FIG. 1, in one embodiment, the gaming activity unit 256 can implement a system-wide gaming activity point system that awards gaming activity points to each player based on the player’s system-wide gaming activity within the wagering game system 200. The gaming activity unit 256 can award gaming activity points for each of the system-wide gaming activity categories described above. Since players can earn gaming activity points by participating in one or more physical casinos, one or more online casinos, and/or in the virtual gaming community website, the players can be encouraged to be active participants in the wagering game system 200 whether they are at home or at a physical casino. After block 302, the flow continues at block 304.

At block 304, the wagering game server 250 determines whether the player’s system-wide gaming activity point total earns the player a system-wide game modifier. For example, as described above with reference to FIG. 1, if the wagering game system 200 implements a tiered structure for awarding multiple types or levels of system-wide game modifiers, the gaming activity unit 256 determines whether the player’s system-wide game activity point total is equal to (or has exceeded) one of the predefined activity point thresholds that awards the player one of the types or levels of system-wide game modifiers. In one implementation (shown in table 410 of FIG. 4A), if the wagering game system 200 implements three levels of system-wide game modifiers, the gaming activity unit 256 can award a level 1 (or silver) system-wide game modifier when the player’s system-wide game activity point total reaches a first predefined activity point threshold (e.g., 5,000 points), award a level 2 (or gold) system-wide game modifier when the player’s system-wide game activity point total reaches a second predefined activity point threshold (e.g., 15,000 points), and award a level 3 (or platinum) system-wide game modifier when the player’s system-wide game activity point total reaches a third predefined activity point threshold (e.g., 30,000 points). It is noted, however, that in other implementations the wagering game server 250 can award system-wide game modifiers at other suitable predefined activity point thresholds to control the exclusiveness and rarity of the system-wide game modifiers. If the wagering game server 250 determines that the player has not earned a system-wide game modifier based on the player’s system-wide gaming activity point total, the flow continues at block 306. Otherwise, if the wagering game server 250 determines that the player has earned a system-wide game modifier based on the player’s system-wide gaming activity point total, the flow continues at block 308.

At block 306, the wagering game server 250 determines whether to award the player a system-wide game modifier based on whether the player has achieved or met certain predefined combinations of game-specific objectives across the wagering game system 200. In one embodiment, the gaming activity unit 256 determines whether the player has achieved certain predefined combinations of game-specific objectives, such as earning certain combinations of non-monetary awards (e.g., game-specific trophies or other awards), reaching certain game-specific levels in some games, unlocking certain game-specific features or accessories in some games, finding certain hidden game assets in some games, and/or triggering certain bonus games, etc. For example, as shown in table 420 of FIG. 4B, the gaming activity unit 256 can award a level 1 system-wide game modifier if the player earns a combination of gold trophies in each of 5 different wagering games A-E, and a level 2 system-wide game modifier if the player earns a combination of platinum trophies in each of the 5 different wagering games A-E. The gaming activity unit 256 can award a level 3 system-wide game modifier if the player earns platinum trophies in each of the 5 different wagering games A-E, reaches level 20 in the non-wagering game F offered via the virtual gaming community website, and unlocks a certain game-specific feature X in the non-wagering game G offered via the virtual gaming community website.

In some embodiments, the gaming activity unit 256 can determine whether the player has earned a system-wide game modifier based on a combination of the player’s system-wide gaming activity point total and whether the player has achieved certain predefined combinations of game-specific game objectives across the wagering game system 200. In one implementation, when the player reaches one of the predefined activity point thresholds, the player can qualify for (but not automatically earn) the corresponding type or level of system-wide game modifier. In addition to qualifying for a system-wide game modifier based on the player’s system-wide gaming activity point total, the player also has to achieve at least one predefined combination of game-specific game objectives to earn the system-wide game modifier. For example, after reaching a level 1 (or silver) system-wide player status based on the player’s system-wide gaming activity point total, the player has to earn silver trophies in each of 5 different wagering games in order to earn a level 1 system-wide game modifier. In another implementation, when the player reaches one of the predefined activity point thresholds associated with a level of system-wide player status, the player can automatically earn one of a plurality of sub-level system-wide game modifier available at each level of system-wide player status. To earn the other sub-levels of system-wide game modifiers, the player has to achieve certain predefined combinations of game-specific game objectives. For example, as shown in table 430 of FIG. 4C, after reaching a level 1 (or silver) system-wide player status based on the player’s system-wide gaming activity point total, the gaming activity unit 256 awards the player a sub-level 1A system-wide game modifier. In the dragon-themed game example described above in FIG. 1, the sub-level 1A system-wide game modifier can modify the game such that the dragon has a shiny metallic blue armor. To earn the sub-level 1B system-wide game modifier, the player has to achieve a certain predefined combination of game-specific objectives. For example, after reaching the level 1 (or silver) system-wide player status (and earning the sub-level 1A system-wide game modifier), if the player earns silver trophies in 3 different wagering games A-C, the gaming activity unit 256 awards the player the sub-level 1B system-wide game modifier. In the dragon-themed game example described above, the sub-level 1B system-wide game modifier can modify the game such that the dragon also has a pair of aerodynamic carbon fiber wings (in addition to the armor). To earn the sub-level 1C system-wide game modifier, the player has to earn gold trophies in 6 different wagering games A-F. In the dragon-themed game example described above, the sub-level 1C system-wide game modifier can modify the game such that the frequency that bonus games are awarded to players is increased. Similarly, when the player reaches a level 2 (or gold) system-wide player status based on the player's system-wide gaming activity point total, the gaming activity unit 256 can award the player sub-level 2A, 2B, and 2C system-wide game modifiers. When the player reaches a level 3 (or platinum) system-wide player status based on the player's system-wide gaming activity point total, the gaming activity unit 256 can award the player sub-level 3A, 3B, and 3C system-wide game modifiers. Furthermore, in some implementations, if the player earns all sub-level system-wide game modifiers in a particular level of system-wide player status, the gaming activity unit 256 can award the player a bonus system-wide game modifier. For example, if the player earns level 1A, level 1B, and level 1C system-wide game modifiers, the gaming activity unit 256 can award the player a bonus level 1X system-wide game modifier. In the dragon-themed game example described above, the bonus level 1X system-wide modifier can modify the game such that the player is offered a new bonus game. It is noted, however, that each of the sub-level system-wide game modifiers can modify the games in various other ways as specified by the predefined game modification specifications associated with the sub-level system-wide game modifiers (e.g., as was described above with reference to FIG. 1).

In some implementations, some levels (or types or sub-levels) of system-wide game modifiers can be more exclusive or rare than other levels (or types or sub-levels) of system-wide game modifiers, and therefore can provide additional (actual and/or perceived) benefits than the other system-wide game modifiers. For example, a level 3 or platinum system-wide game modifier can be more exclusive or rare (and provide more actual and/or perceived benefits) than a level 1 or silver system-wide game modifier. Also, a sub-level C system-wide game modifier can be more exclusive or rare (and provide more actual and/or perceived benefits) than sub-level A system-wide game modifier.

In some implementations, the wagering game system 200 may not reveal to players the predefined combinations of objectives (e.g., combination of game-specific achievements) the player has to meet (online and/or in-casino) in order to earn a system-wide game modifier. This can help to maintain player interest in the both wagering and non-wagering games (whether in a physical casino or online), and encourage players to interact within the virtual gaming community service to share tips about earning system-wide game modifiers and share other gaming experiences. For example, if there are various sub-levels of system-wide game modifiers the player can earn when the player reaches a certain level of system-wide player status, the wagering game system 200 may not reveal how many sub-levels of modifiers there are within each level, the criteria for earning each sub-level modifier, and whether earning certain combinations of sub-level modifiers can earn players bonus modifiers. When players determine how certain system-wide game modifiers are earned, the players may post their findings in the virtual gaming community website and tell their friends, which can encourage other players to participate in the wagering game system 200 to earn these modifiers.

If the wagering game server 250 determines that the player has not earned a system-wide game modifier, the flow loops back to block 302 to continue monitoring the player's gaming activity in the wagering game system 200. Otherwise, if the wagering game server 250 determines that the player has earned a system-wide game modifier, the flow continues at block 308.

At block 308, the wagering game server 250 awards the player the system-wide game modifier. As described above with reference to FIG. 1, in one embodiment, the gaming activity unit 256 awards the player a system-wide game modifier by associating the player's wagering game system account with the system-wide game modifier. In one example, the gaming activity unit 256 can store an indication that the player has earned the system-wide game modifier in the player's wagering game system account (e.g., set one or more bits in the player's wagering game system account). The gaming activity unit 256 can also store a visual or graphical indicator in the profile of the player's wagering game system account. After block 308, the flow continues at block 310.

At block 310, the wagering game server 250 modifies the games played by the player (online and/or in a physical casino) based on the system-wide game modifier, as will be further described below with reference to FIG. 5. In some embodiments, after the player earns the system-wide game modifier, the wagering game server 250 determines whether to modify, and how to modify, each game the player selects from the wagering game system 200 based on the type or level of system-wide game modifier the player has earned.

FIG. 5 is a flow diagram ("flow") 500 illustrating operations for implementing system-wide game modifiers in a wagering game system, according to some embodiments. The flow of 500 will be described with reference to the example system architecture of FIG. 2. The flow diagram begins at block 502.

At block 502, the wagering game server 250 determines a player's wagering game system account and an in-casino or online game selected by the player based on login and game selection information received from a gaming machine 260 in the wagering game system 200. In some cases, the player may already be logged in to the wagering game system 200 and the player selects a new game to play at the gaming machine 160. In one embodiment, the game management unit 252 of the wagering game server 250 can access the account server 270 to identify the player's wagering game system account and associate the gaming session with the player's wagering game system account. The game management unit 252 can also identify which game the player selected based on a game ID or other type of identification information. After block 502, the flow continues at block 504.

At block 504, the wagering game server 250 determines whether the player's wagering game system account includes a system-wide game modifier. In one embodiment, the game management unit 252 can determine whether the player's wagering game system account includes an indication that the player has been awarded a system-wide game modifier (e.g., one or more bits in the account are set). If the game management unit 252 determines that the player's wagering game system account includes a system-wide game modifier, the flow continues to block 506. Otherwise, the flow loops back to the beginning of block 504, where the game management unit 252 continues to monitor whether the player has earned a system-wide game modifier.

At block 506, the wagering game server 250 determines whether the selected game can be modified based on the system-wide game modifier to improve the player's gaming experience. In one embodiment, the game management unit 252 determines whether the wagering game server 250 includes game modification specifications for the selected game. In some cases, not all the games available via the wagering game system 200 can be modified based on the system-wide game modifiers. For example, the game developers of some games may not have configured the games to be modified based on the system-wide game modifiers, and may not have defined game modification specifications associated with the games. If the game management unit 252 determines that the game can be modified according to the system-wide game modifier, the flow continues at block 508. Otherwise, the flow continues at block 512.

At block 508, the wagering game server 250 determines the type or level of the system-wide game modifier associated with the player's wagering game system account. In one embodiment, the game management unit 252 determines the type or level of the system-wide game modifier that the player has earned. For example, as described above with reference to FIGS. 1 and 3, the game management unit 252 can determine whether it is a level 1, level 2, or level 3 system-wide game modifier, or whether the system-wide game modifier is a silver, gold, or platinum system-wide game modifier. In another example, the game management unit 252 can further determine whether it is a sub-level system-wide game modifier (e.g., for level 1, the player can earn level 1A, level 1B, or level 1C system-wide game modifiers). As described above with reference to FIG. 3, multiple system-wide game modifiers (e.g., multiple sub-levels of system-wide game modifiers) can be awarded when a player reaches a certain level of system-wide player status (e.g., a level 1 or silver system-wide player status, a level 2 or gold system-wide player status, or a level 3 or platinum system-wide player status). After block 508, the flow continues at block 510.

At block 510, the wagering game server 250 modifies the selected game according to the predefined game modification specifications associated with the selected game and the type or level of system-wide game modifier. In some embodiments, the game management unit 252 determines the predefined game modification specifications associated with the selected game and the type or level of system-wide game modifier, and modifies the selected game based on the predefined game modification specifications. As described above with reference to FIG. 1, game developers, the virtual community gaming website developers, and/or the system operator determine and define the game modification specifications associated with each game and gaming-related applications for each specific type or level of system-wide game modifier. In one embodiment, the game management unit 252 can modify the selected game according the predefined game modification specifications by configuring various game play elements associated with the game; for example, configuring game play elements, such as executable game code, lookup tables, configuration files, audio or visual representations of the game, game assets, or the like. In one example, in a server-based system such as the wagering game system 200, the game management unit 252 can modify the game selected by the player according to the predefined game modification specifications associated with the selected game and the system-wide game modifier earned by the player. The game management unit 252 can then provide the modified game play elements and/or the modified game content to the gaming machine 260 for presentation to the player. It is noted, however, that in some embodiments the game management unit 252 can cause some aspects of the game to be modified at the gaming machine 260 where the player logged in (e.g., a gaming machine 260 at a physical casino) by providing an indication to the gaming machine 260 that the player has earned a system-wide game modifier and the type or level of system-wide game modifier.

As described above with reference to FIG. 1, the wagering and non-wagering games offered via the wagering game system 200 (e.g., at one or more physical casinos, one or more online casinos, or the virtual gaming community website) can be modified in a variety of ways specified by the predefined game modification specifications. For example, the games can be modified by changing the "look and feel" of the games, such as changing the background design, theme, the color scheme, audio/visual presentations, etc. In another example, the games can be modified by changing the game content of the games, such as offering the player new game content (e.g., providing the player a new dragon in a dragon game), or offering the player new accessories for the game content (e.g., new type of wings for the dragon in the dragon game). The new game content or the new accessories for the game content can provide players actual benefits (e.g., a stronger and/or faster dragon that can win more monetary or non-monetary awards), and/or provide players perceived benefits (the perception of a faster and/or stronger dragon or other improved "look and feel" attributes). In another example, the games can be modified to offer new bonus games (or other types of secondary games), offer extra bonus games, or increase the frequency that bonus games are awarded to players. In another example, the games can be modified such that other game content or game experiences can be unlocked (e.g., new game characters, new customization options, new game obstacles, new game levels, new game fighting moves, new game weapons, new health and/or skill power-ups, etc.). In other examples, the games can be modified such that the math associated with the games is modified for the player's benefit. For example, the math associated with the games can be modified such that the player has a higher probability of winning monetary and/or non-monetary awards each round of the wagering game, the player wins extra monetary and/or non-monetary awards each time the player wins, and/or the player is provided other benefits (e.g., the player is provided a free round of the game for every 20 rounds the player plays, the player's bet amount is automatically increased to a maximum bet amount every 10 rounds the player plays, the player's win amount is increased by 10% (or any other suitable percentage) for every win, etc.). It is noted, however, that in other embodiments the games can be modified in various other ways to enhance the player's gaming experience (e.g., by improving the "look and feel" of the games, by providing actual or perceived benefits, etc.). It is further noted that various gaming-related applications (e.g., chat, forums, avatars, mini-games, etc.) offered via the virtual gaming community website can also be modified similarly as was described above for wagering and non-wagering games (e.g., changing the "look and feel" of chat applications or mini-games, offering new accessories for the player's avatar, etc.).

In the wagering game system 200, since players can earn system-wide game modifiers by participating both online and in a physical casino, players can be encouraged to participate year round at one or more physical casinos, one or more online casinos, or the virtual gaming community website. Furthermore, since the system-wide game modifiers can modify games offered both online and in one or more physical casino, the players can be encouraged to play both online and in one or more physical casinos. For example, if a player earns a system-wide game modifier when playing online (e.g., based on the player's system-wide gaming activity point total and/or achieving a combination of game-specific objectives), the player can be motivated to go play wagering games in a physical casino to see how the wagering games are modified in the physical casino and see what other benefits the player receives at the physical casino. In some implementations, when a player earns the system-wide game modifier, the wagering game server 250 can cause the online casino or the virtual gaming community website to further encourage the player to go play at a physical casino by providing the player a preview of the benefits of playing at the physical casino with the system-wide game modifier, by offering the player one-time promotions (e.g., free spins, bonus credits, etc.) for trying certain wagering games at the physical casino (in addition to the benefits associated with the system-wide game modifiers), by offering the player discounts on hotels and/or other travel expenses, etc. Similarly, in another example, if a player earns a system-wide game modifier when playing at a physical casino, the player can be motivated to go play non-wagering or wagering games online (or other gaming-related applications) when the player returns home to see how the games are modified online and see what other benefits the player receives online based on the system-wide game modifier. In some implementations, when a player earns the system-wide game modifier at a physical casino, the wagering game server 250 can further encourage the player to participate online by providing the player a preview of the benefits of playing online with the system-wide game modifier, by offering the player one-time promotions (e.g., free spins, bonus credits, etc.) for trying certain online games (in addition to the benefits associated with the system-wide game modifiers), etc. In one example, the wagering game server 250 can provide the player a preview of one or more of the benefits of playing either online or in a physical casino with the system-wide game modifier immediately after earning the system-wide game modifier. In another example, the wagering game server 250 can provide the player a preview of one or more of the benefits of playing either online or in a physical casino with the system-wide game modifier when the wagering game server 250 detects that the player logs out of the gaming machine 260 (whether online or in-casino). For instance, if the player is playing at a physical casino and earns a system-wide game modifier, the wagering game server 250 can wait until the player logs out of the gaming machine 260 to promote one or more of the benefits of playing online with the system-wide gaming modifier, and/or to promote the benefits of playing another game in the physical casino with the system-wide game modifier. In some embodiments, in addition to not disclosing to players of the system 200 how certain system-wide game modifiers are earned, the system 200 may not disclose to players how each type or level of system-wide game modifier modifies each of the games available via the system 200 (whether online or in a physical casino). In some embodiments, the system 200 may reveal how the system-wide game modifiers affect some, but not all, of the games available via the system 200, or may just reveal how a certain type or level of system-wide game modifier affects the games (without revealing how the other types or levels of system-wide game modifiers affects the games). By not revealing some or all of the benefits associated with some or all of the system-wide game modifiers, the players can be encouraged to participate in the system 200 to experience the benefits of the system-wide game modifiers. Then, after determining the benefits associated with the system-wide game modifiers, the players can be encouraged to share their findings with other players via the virtual gaming community website (e.g., chat, forms, message boards, etc.), which may also motivate other players to participate in the system 200.

At block 512, the wagering game server 250 determines whether the player selected a new in-casino or online game. For example, the game management unit 252 receives an indication (e.g., a message including a game ID or other identifying information) from the gaming machine 260 when the player selects a new game. If the game management unit 252 determines that the player has not selected a new in-casino or online game, the flow continues at block 514. Otherwise, the flow continues at block 516.

At block 514, the wagering game server 250 determines whether the player logs out from the wagering game system 200. For example, the game management unit 252 receives an indication from the gaming machine 260 when the player ends the gaming session and logs out from the system 200. If the game management unit 252 determines that the player has not logged out, the flow loops back to block 512. Otherwise, the flow ends. It is noted that throughout the process shown in FIG. 5, the wagering game server 250 continually tracks the player's gaming activity (e.g., as described above with reference to FIG. 3) to determine whether the player has earned additional system-wide game modifiers (e.g., a higher level or sub-level of system-wide game modifier).

At block 516, the wagering game server 250 identifies the new game the player selected. For example, the game management unit 252 can determine which game the player selected based on a game ID or other identification information received from the gaming machine 260. After block 516, the flow loops back to block 506, where the game management unit 252 determines whether the newly selected game can be modified based on the system-wide game modifier the player has earned.

Additional Example Operating Environments

This section describes example operating environments, systems and networks, and presents structural aspects of some embodiments.

Wagering Game Machine Architecture

Figure 6:
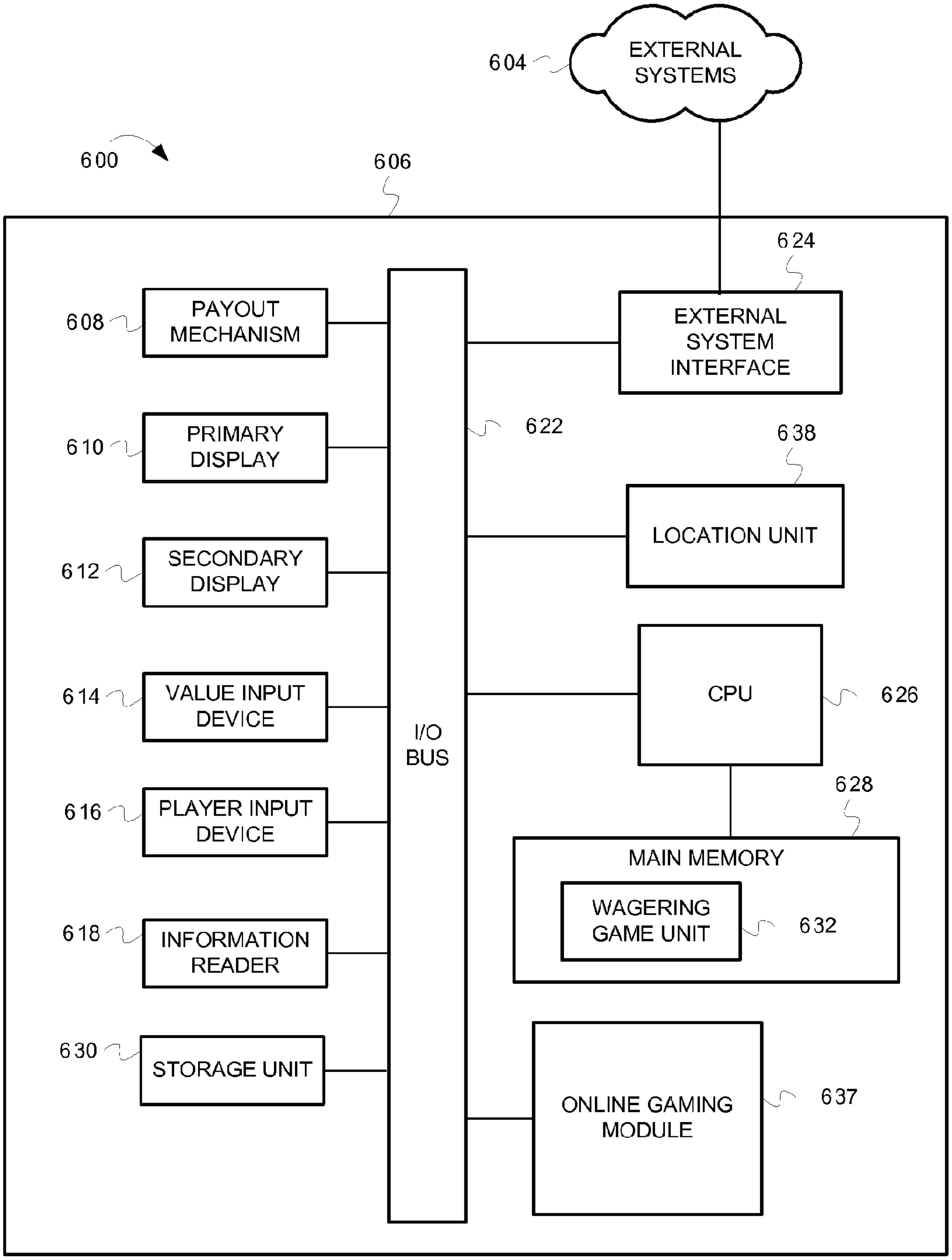
FIG. 6 is a conceptual diagram that illustrates an example of a wagering game machine architecture, according to some embodiments.

FIG. 6 is a conceptual diagram that illustrates an example of a wagering game machine architecture 600, according to some embodiments. In FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In some embodiments, the wagering game unit 632 can present wagering games, such as video poker, video black jack, video slots, video lottery, reel slots, etc., in whole or part. The wagering game unit 632 may also facilitate the implementation of system-wide game modifiers in a wagering game system, e.g., as described above with reference to FIGS. 1-5.

The CPU 626 is also connected to an input/output ("I/O") bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks). The external system interface 624 can include logic for exchanging information over wired and wireless networks (e.g., 802.11g transceiver, Bluetooth transceiver, Ethernet transceiver, etc.)

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In some embodiments, the wagering game machine 606 can include additional peripheral devices and/or more than one of each component shown in FIG. 6. For example, in some embodiments, the wagering game machine 606 can include multiple external system interfaces 624 and/or multiple CPUs 626. In some embodiments, any of the components can be integrated or subdivided.

In some embodiments, the wagering game machine 606 includes an online gaming module 637. The online gaming module 637 can process communications, commands, or other information, where the processing can control and present online wagering games. In some embodiments, the online gaming module 637 can work in concert with the wagering game unit 632, and can perform any of the operations described above.

Furthermore, any component of the wagering game machine 606 can include hardware, firmware, and/or machine-readable media including instructions for performing the operations described herein.

Example Wagering Game Machines

Figure 7:
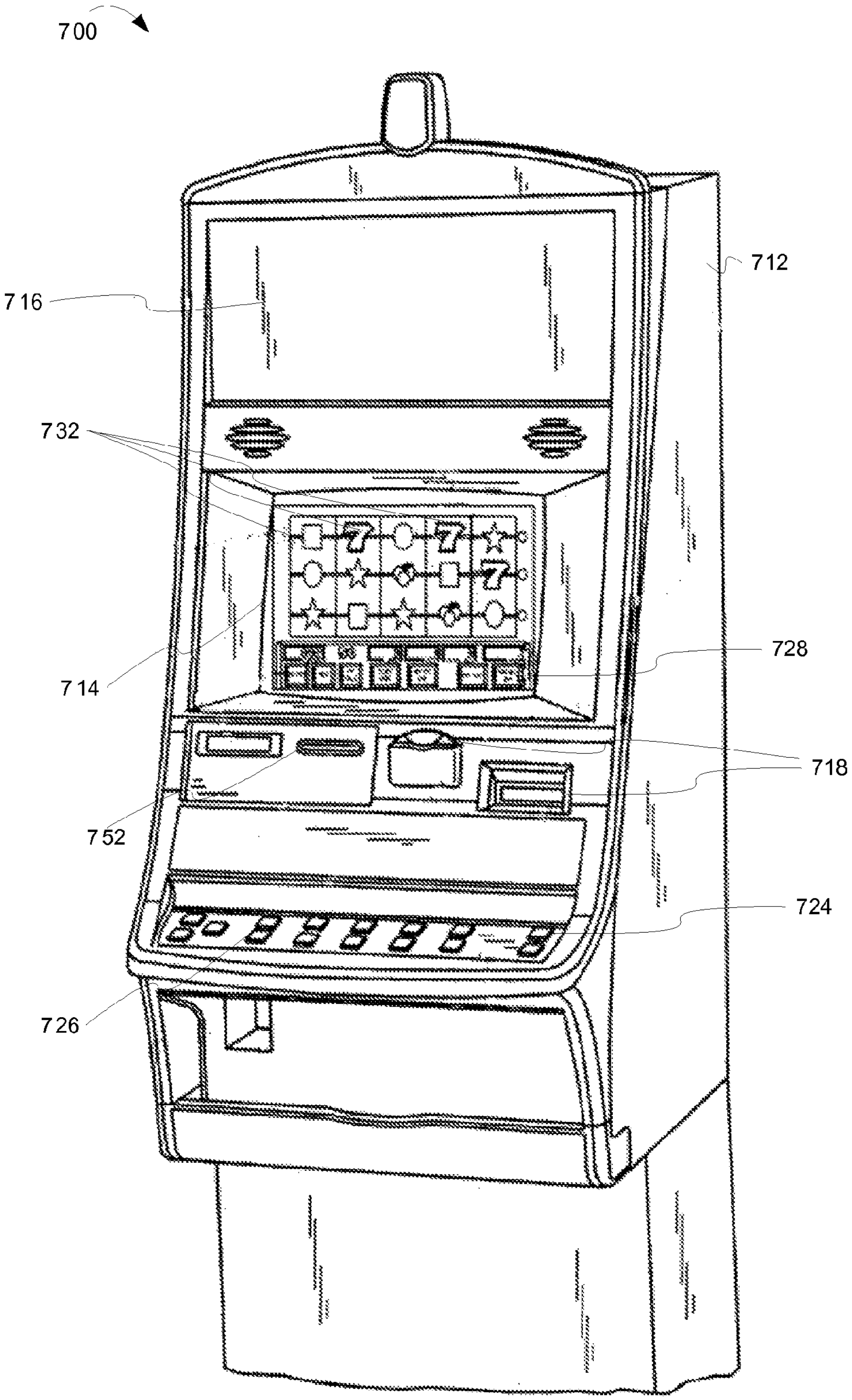
FIG. 7 is a perspective view of a wagering game machine, according to example embodiments.

FIG. 7 is a perspective view of a wagering game machine, according to example embodiments. Referring to FIG. 7, a wagering game machine 700 is used in gaming establishments, such as casinos. In some embodiments, the wagering game machine 700 can implement some of the functionality described above for facilitating the implementation of system-wide game modifiers in a wagering game system, e.g., as described above with reference to FIGS. 1-6.

According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. In some implementations, the primary display 714 can also display information about a bonus wagering game and a progressive wagering game. The wagering game machine 700 also includes a secondary display 716 for displaying bonus wagering games, wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method comprising:

awarding, at a wagering game server of a wagering game system, a system-wide game modifier, to a wagering game system account associated with a player, based on the player's system-wide gaming activity including playing a plurality of wagering games presented online and on wagering game machines in casinos;

determining, at the wagering game server, that the player has selected a wagering game of the plurality of wagering games for play via the wagering game system;

for the wagering game selected by the player via the wagering game system:

determining, at the wagering game server, that the wagering game system account associated with the player has been awarded the system-wide game modifier; and before presenting the wagering game, modifying, based on predefined game modification specifications associated with the wagering game and the system-wide game modifier, one or more of audio content of the wagering game or video content of the wagering game, wherein the modifying does not affect a probability of winning the wagering game;

detecting, by a value input device of a wagering game machine in the wagering game system, a physical item associated with monetary value;

creating, in a non-transitory memory device, a credit balance based on the monetary value;

determining, by the wagering game machine, a result for the wagering game; and processing, by a game management unit, a wager from the credit balance, wherein the wager is associated with the result for the wagering game.

2. The method of claim 1, further comprising:

determining, at the wagering game server, that the player selected a non-wagering game of a plurality of non-wagering games for play online via the wagering game system;

for the non-wagering game selected by the player in the wagering game system:

determining, at the wagering game server, that the wagering game system account associated with the player has been awarded the system-wide game modifier; and modifying the non-wagering game based on predefined game modification specifications associated with the non-wagering game and the system-wide game modifier.

3. The method of claim 2, wherein said determining, at the wagering game server, that the player selected the wagering game comprises:

receiving, at the wagering game server, a message from one of the gaming machines at the casinos, the message indicating that the player selected the wagering game at the gaming machine; and identifying the wagering game based on identification information included in the message.

4. The method of claim 1, wherein the player's system-wide gaming activity includes participation in a virtual gaming community website.

5. The method of claim 1, wherein said modifying the wagering game based on the predefined game modification specifications associated with the wagering game and the system-wide game modifier comprises modifying game content of the wagering game based on the predefined game modification specifications associated with the wagering game and the system-wide game modifier.

6. The method of claim 1, wherein said the system-wide game modifier based on the player's system-wide gaming activity comprises:

awarding, at the wagering game server, system-wide gaming activity points to the player's wagering game system account based on the player's system-wide gaming activity;

determining, at the wagering game server, to award the system-wide game modifier to the player based on the player's system-wide gaming activity point total exceeding one of a plurality of a system-wide gaming activity point thresholds.

7. The method of claim 1 further comprising:

revealing to the player how one or more of the wagering games presented online and on wagering game machines in casinos will be modified based on the system-wide game modifier.

8. The method of claim 1, wherein said determining, at the wagering game server, that the player's wagering game system account has been awarded the system-wide game modifier comprises determining that the player's wagering game system account includes an indicator indicating the player has been awarded the system-wide game modifier.

9. A wagering game system comprising:

a wagering game server comprising:

a gaming activity unit configured to:

monitor in-casino and online gaming activity associated with a player in the wagering game system;

determine that a wagering game system account associated with the player should be awarded a system-wide game modifier based on the player's in-casino and online gaming activity in the wagering game system; and a game management unit configured to determine when the player selects each wagering game of a plurality of wagering games selected by the player for play via the wagering game system, wherein, for each wagering game of the plurality of wagering games selected by the player via the wagering game system, the game management unit is configured to:

determine whether the wagering game system account associated with the player has been awarded the system-wide game modifier; and before presenting the wagering game, modify, based on game modification specifications associated with the wagering game and the system-wide game modifier, one or more of audio content of the wagering game or video content of the wagering game, wherein the modifying does not affect a probability of winning the wagering game;

a wagering game machine including a value input device configured to detect a physical item associated with monetary value;

a wagering game unit configured to determine a result for the wagering game, and to processing a wager based on the monetary value, wherein the wager is associated with the result for the wagering game.

10. The wagering game server of claim 9, wherein the game management unit is configured to modify game content associated with each wagering game selected by the player based on predefined game modification specifications associated with the wagering game and the system-wide game modifier.

11. The wagering game server of claim 9, wherein the gaming activity unit configured to determine that the player's wagering game system account should be awarded a system-wide game modifier based on the player's in-casino and online gaming activity comprises the gaming activity unit configured to:

monitor the player's in-casino and online gaming activity;

award system-wide gaming activity points to the player's wagering game system account based on the player's in-casino and online gaming activity;

determine whether to award a system-wide game modifier to the player based on whether the player's system-wide gaming activity point total exceeds a system-wide gaming activity point threshold; and award the player's wagering game system account the system-wide game modifier in response to determining that the player's system-wide gaming activity point total exceeds the system-wide gaming activity point threshold.

12. A computer-implemented method comprising:

determining, at a wagering game server of a wagering game system, system-wide gaming activity associated with a player, wherein the system-wide gaming activity includes playing wagering games online and at wagering game machines in casinos;

determining, at the wagering game server, whether to award a system-wide game modifier to the player based on the player's system-wide gaming activity;

awarding, at the wagering game server, the system-wide game modifier to a wagering game system account associated with the player in response to determining that the player's system-wide gaming activity qualifies the player for the system-wide game modifier;

determining, at the wagering game server, that the player has selected a wagering game for play via the wagering game system, wherein the wagering game includes a base game and a bonus game;

determining, after the player has selected the wagering game, that the wagering game system account associated with the player has been awarded the system-wide game modifier; and before presenting the wagering game, modifying based on predefined game modification specifications associated with the wagering game and the system-wide game modifier, one or more of audio content of the wagering game or video content of the wagering game, wherein the modifying does not affect a probability of winning the wagering game;

detecting, by a value input device of a wagering game machine in the wagering game system, a physical item associated with monetary value;

creating, in a non-transitory memory device, a credit balance based on the monetary value;

determining a result for the wagering game; and processing, by a game management unit of the wagering game machine, a wager from the credit balance, wherein the wager is associated with the result for the wagering game.

13. The method of claim 12 wherein the determining whether to award the system-wide modifier comprises:

determining whether the player account includes a quantity of gaming activity points greater than one of a plurality of thresholds, wherein the gaming activity points were acquired in the wagering game system account by the player performing system-wide gaming activity.

14. The method of claim 12 further comprising:

revealing to the player how future wagering games, played online and at wagering games in casinos, will be modified based on the system-wide game modifier.

15. One or more non-transitory machine-readable storage media, having instructions stored therein, which, when executed by one or more processors causes the one or more processors to perform operations processing system-wide game modifiers, the instructions comprising:

instructions to determine, by a wagering game server of a wagering game system, that a wagering game system account associated with a player should be awarded a system-wide game modifier based on the player's system-wide gaming activity in a wagering game system;

instructions to determine, by the wagering game server, when the player selects each wagering game of a plurality of wagering games selected by the player for play via the wagering game system;

for each wagering game of the plurality of wagering games selected by the player in the wagering game system instructions to determine, by the wagering game server, that the wagering game system account associated with the player has been awarded the system-wide game modifier; and instructions to, before presentation of the wagering game, modify, based on game modification specifications associated with the selected wagering game and the system-wide game modifier, one or more of audio content of the wagering game or video content of the wagering game, wherein the modification does not affect a probability of winning the wagering game;

instructions to detect, by a value input device of a wagering game machine in the wagering game system, a physical item associated with monetary value;

instructions to create, in a non-transitory memory device, a credit balance based on the monetary value;

instructions to determine a result for the wagering game; and instructions to process, by a game management unit, a wager from the credit balance, wherein the wager is associated with the result for the wagering game.

16. The machine-readable storage media of claim 15, wherein said instructions to modify the selected wagering game based on predefined game modification specifications associated with the selected wagering game and the system-wide game modifier comprises instructions to modify game content of the selected wagering games based on predefined game modification specifications associated with the selected wagering game and the system-wide game modifier.

17. The machine-readable storage media of claim 15, wherein the instructions further comprise:

instructions to monitor the player's system-wide gaming activity;

instructions to award system-wide gaming activity points to the player's wagering game system account based on the player's system-wide gaming activity;

instructions to determine whether to award a system-wide game modifier to the player based on whether the player's system-wide gaming activity point total exceeds a system-wide gaming activity point threshold; and instructions to award the player's wagering game system account the system-wide game modifier in response to determining that the player's system-wide gaming activity point total exceeds the system-wide gaming activity point threshold.

18. The computer implemented method of claim 1, wherein the system-wide game modifier awarded to the wagering game system account associated with the player is not consumed when it is used to modify the wagering game.

* * * * *